United States Patent [19]

Takahashi et al.

[11] Patent Number: 5,018,594

[45] Date of Patent: May 28, 1991

[54] REAR-WHEEL STEERING SYSTEM FOR FOUR-WHEEL STEERING VEHICLE

[75] Inventors: Akira Takahashi; Yuji Soejima, both of Tokyo, Japan

[73] Assignee: Fuji Jukogyo Kabushiki Kaisha, Tokyo, Japan

[21] Appl. No.: 451,804

[22] Filed: Dec. 18, 1989

[30] Foreign Application Priority Data

Dec. 22, 1988 [JP] Japan ............................ 63-166005[U]
Dec. 22, 1988 [JP] Japan ............................ 63-166006[U]

[51] Int. Cl.⁵ .......................... B62D 5/06; B62D 7/15
[52] U.S. Cl. .................................... 180/140; 180/142; 280/91; 364/424.05
[58] Field of Search ............... 180/140, 141, 142, 143, 180/79.1; 280/419, 91; 364/424.05, 426.01

[56] References Cited

U.S. PATENT DOCUMENTS

| 4,645,025 | 2/1987 | Ohe et al. ........................ 180/79.1 |
| 4,722,545 | 2/1988 | Gretz et al. ...................... 180/141 X |
| 4,781,262 | 11/1988 | Nakamura et al. ........ 364/424.05 X |
| 4,869,335 | 9/1989 | Takahashi ....................... 180/79.1 X |

Primary Examiner—Charles A. Marmour
Assistant Examiner—Kevin Hurley
Attorney, Agent, or Firm—Beveridge, DeGrandi & Weilacher

[57] ABSTRACT

A rear-wheel steering system is provided in a four-wheel steering vehicle having at least a front-wheel steering angle sensor, a vehicle speed sensor, a control unit for carrying out rear-wheel steering control in dependency on signals detected by these sensors, and an electric motor controlled by the control unit to steer the rear wheels. This rear-wheel steering system is provided with detecting means for detecting front-wheel steering force, front-wheel lateral force or lateral acceleration of the vehicle. The control unit is provided with a front-wheel neutral point correction means for determining the zero point of the front-wheel steering angle which causes the rear-wheel steering angle to be zero with respect to a signal indicating that the front-wheel steering force, the front-wheel lateral force or the lateral acceleration of the vehicle thus detected by the detecting means is substantially zero.

6 Claims, 4 Drawing Sheets

REAR-WHEEL STEERING SYSTEM FOR FOUR-WHEEL STEERING VEHICLE

BACKGROUND OF THE INVENTION

The present invention relates to vehicles having four-wheel steering system, more particularly, to a rear-wheel steering system for a four-wheel steering vehicle.

Four-wheel steering vehicles in which the rear wheels are steered depending on the steering operation of the front wheels have been variously developed. Many of these vehicles are of the type wherein rear-wheel steering is carried out in dependency on signals respectively from a steering wheel turning angle sensor for detecting a turned angle of the steering wheel and from a vehicle speed sensor for detecting a vehicle speed. One example of this type of vehicle is disclosed in Japanese Utility Model Laid-Open Publication No. 73475/1986.

In a known four-wheel steering vehicle of the character described above, in general, a rear-wheel steering neutral position (rear-wheel steering angle zero) coincides with a point at which a signal from the steering wheel turned angle sensor is zero.

However, setting of the zero point of the signal from the steering wheel angle sensor is extremely difficult. The following example of the problems encountered will illustrate this difficulty more specifically. The zero point of the signal from the steering wheel angle sensor with respect to the neutral position of the front wheels (position for straight-ahead driving state) is initially set as the reference position Even when this is done, various factors cause this zero point to be inaccurate. For example, some deviation is caused by variation with lapse of time in the suspension alignment. As another example, an unbalance in the characteristics of the left and right tires are apt to arise. Examples of such tire characteristics are inflation pressure, abrasion loss, and tire uniformity. Due to such disturbing factors, some lateral force develops even when the front wheels are in the positions for straight-ahead driving state. Consequently, straight-ahead driving becomes impossible in this state. In such a case, a driver instinctively turns the steering wheel slightly, almost unconsciously, to restore the vehicle to its straight-ahead driving state. However, when the vehicle assumes this state, the point for sustaining the straight-ahead driving state by turning the steering wheel slightly becomes the actual steering wheel neutral position. This actual position is offset from the initially set zero point.

In such a driving state, while the front wheels are in their straight-ahead driving state, the steering wheel angle sensor generates signal indicating that the front wheels have been steered through an angle corresponding to the deviation from the initially set zero point. This signal causes the rear wheels to be steered according thereto. Thus, the straight-ahead driving is disrupted. As a result, a driver must further correct the steering wheel angle, so that the vehicle undergoes deviant running or bias running can be caused.

SUMMARY OF THE INVENTION

It is an object of the present invention to provide measures for solving such problems of the prior art as described above.

According to the present invention, there is provided a rear-wheel steering system for a four-wheel steering vehicle having at least a front-wheel steering angle sensor, a vehicle speed sensor, a control unit for carrying out rear-wheel steering control in dependency on the front-wheel steering angle and the vehicle speed detected respectively by the front-wheel steering angle sensor and the vehicle speed sensor, and an actuator controlled by the control unit to steer the rear wheels. The rear-wheel steering system is characterized by the provision of detecting means for detecting front-wheel steering force, front-wheel lateral force or lateral acceleration of the vehicle. The present invention is further characterized by the provision of the control unit of a front-wheel neutral point correction means for determining the zero point of the front-wheel steering angle which causes the rear-wheel steering angle to be zero with respect to a signal. The signal indicates that the front-wheel steering force, the front-wheel lateral force or the lateral acceleration of the vehicle detected by the detecting means is substantially zero.

The driving state of the vehicle wherein the front-wheel steering force, the front-wheel lateral force, or the lateral acceleration being zero means that the vehicle is actually in the state of straight-ahead driving. Therefore, the zero point of the front-wheel steering angle which become a reference point of the front-wheel steering angle detected by the front-wheel steering angle sensor is corrected at the point where the front-wheel steering force, the front-wheel lateral force, or the lateral acceleration is substantially zero. By this step, the rear-wheel steering control is carried out by the use of the front-wheel steering angle after its correction with the point at which the vehicle is actually in the straight-ahead driving state as a reference point. Thus, abnormalities such as the rear wheels being steered even though the vehicle under straight-ahead driving state are eliminated.

The further features of the present invention will become understood from the following detailed description referring to the accompanying drawings.

DESCRIPTION OF THE PREFERRED EMBODIMENTS

Figure 1:
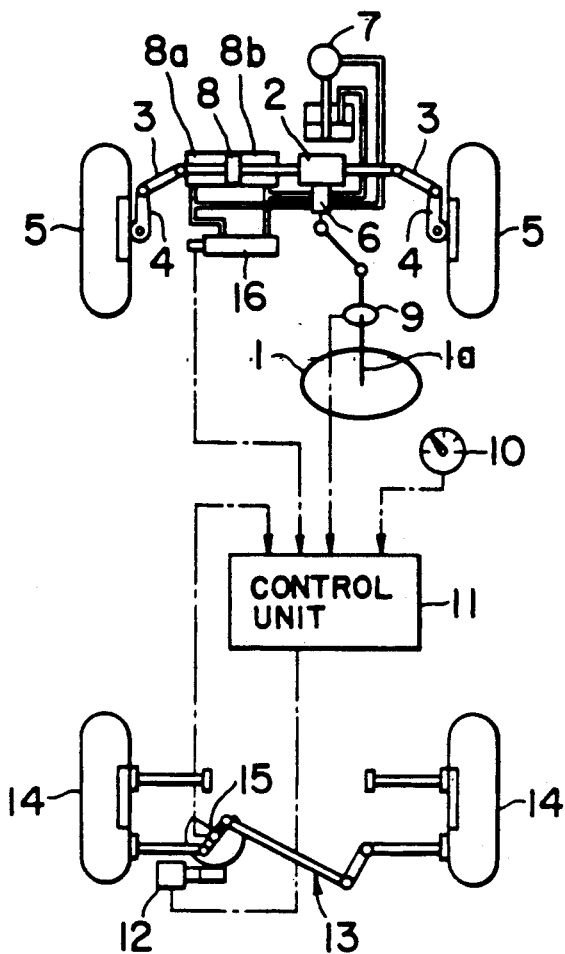
FIG. 1 is a schematic plan view showing a control system for the rear-wheel steering system according to the present invention.

Referring to FIG. 1, a vehicle indicated therein has front wheels 5, 5. The front wheels 5, 5 are supported by knuckle arms 4, 4. The ends of the knuckle arms 4, 4 are connected by tie-rod links 3, 3. The tie-rods 3, 3 are actuated by a gear box 2 for front-wheel steering. The gear box 2 is actuated by the turning of a steering wheel 1 through a steering shaft 1a. Thus, when the steering wheel 1 is turned, the steering shaft 1a is rotated. The rotation of the steering shaft 1a is then transmitted through the gear box 2, the tie-rods 3, 3, and the knuckle arms 4, 4 to steer the front wheels 5, 5.

At the same time, the steering torque applied through the steering wheel 1 and the steering shaft 1a is transmitted to a control valve 6. The control valve 6 thereupon operates in dependency on the steering torque to direct pressurized hydraulic fluid on the delivery side of a hydraulic pressure pump 7 to either one of the left and right hydraulic pressure chambers 8a and 8b of a hydraulic power cylinder 8. Hydraulic assist force in the steering direction is thus generated. The steering force required to turn the steering wheel is thereby lessened. The hydraulic pump 7 is driven by the engine (not shown).

The steering angle of the steering wheel 1 or the steering shaft 1a, that is, the front-wheel steering angle, is detected by a steering wheel angle sensor 9. Vehicle speed is detected by a vehicle speed sensor 10. The resulting steering wheel angle signal and the vehicle speed signal generated accordingly as detection signals respectively by the steering wheel angle sensor 9 and the vehicle speed sensor 10 are inputted into a control unit 11. The control unit 11 operates in dependency on these input signals to determine a reference rear-wheel steering angle. The control unit 11 further generates a corresponding output. The output is transmitted to an actuator for rear-wheel steering such as an electric motor 12. The motor 12 thereupon operates through a rear-wheel steering mechanism 13 to steer the rear wheels 14, 14. The rear-wheel steering mechanism 13 comprises a speed-reduction mechanism, a linkage mechanism, and other parts (not shown).

The rear-wheel steering mechanism 13 is further provided with a rear-wheel steering angle sensor 15 for detecting an actual rear-wheel steered angle. In accordance with this detection, the rear-wheel steering angle sensor 15 generates an actual rear-wheel steering angle signal. The signal is inputted into the control unit 11. As a result, the rear wheels 14, 14 are steered until the actual rear-wheel steering angle coincides with the reference rear-wheel steering angle.

The difference between the hydraulic pressures respectively in the left and right hydraulic pressure chambers 8a and 8b of the hydraulic power cylinder 8 is detected by a hydraulic pressure difference sensor 16. The hydraulic pressure difference sensor/6 generates a hydraulic pressure difference signal. The hydraulic pressure difference signal is also inputted into the control unit 11.

The operation of the illustrated embodiment is as follows. Hydraulic pressure is supplied to either one of the left and right pressure chambers 8a, 8b of the hydraulic power cylinder 8 responsive to the steering torque thus transmitted through the steering shaft 1a when the steering wheel 1 is turned. Accordingly, the hydraulic assist force in the steering direction is generated. Therefore, the pressure difference signal from the hydraulic pressure difference sensor 16 corresponds to the steering torque of the steering wheel 1, that is, the front-wheel steering force. Furthermore, a lateral force acting on the front wheels 5, 5 is produced when the front wheels 5, 5 are in the steering state. In dependency on the lateral force, the difference between the hydraulic pressures in the left and right pressure chambers 8a and 8b is created. For this reason, the hydraulic pressure difference signal from the hydraulic pressure difference sensor 16 corresponds also to the front-wheel lateral force mentioned above. Therefore, this means that the front wheels 5, 5 can be in an angular position for straight-ahead driving state when the hydraulic pressure difference signal of the pressure difference sensor 16 is zero.

Figure 2:
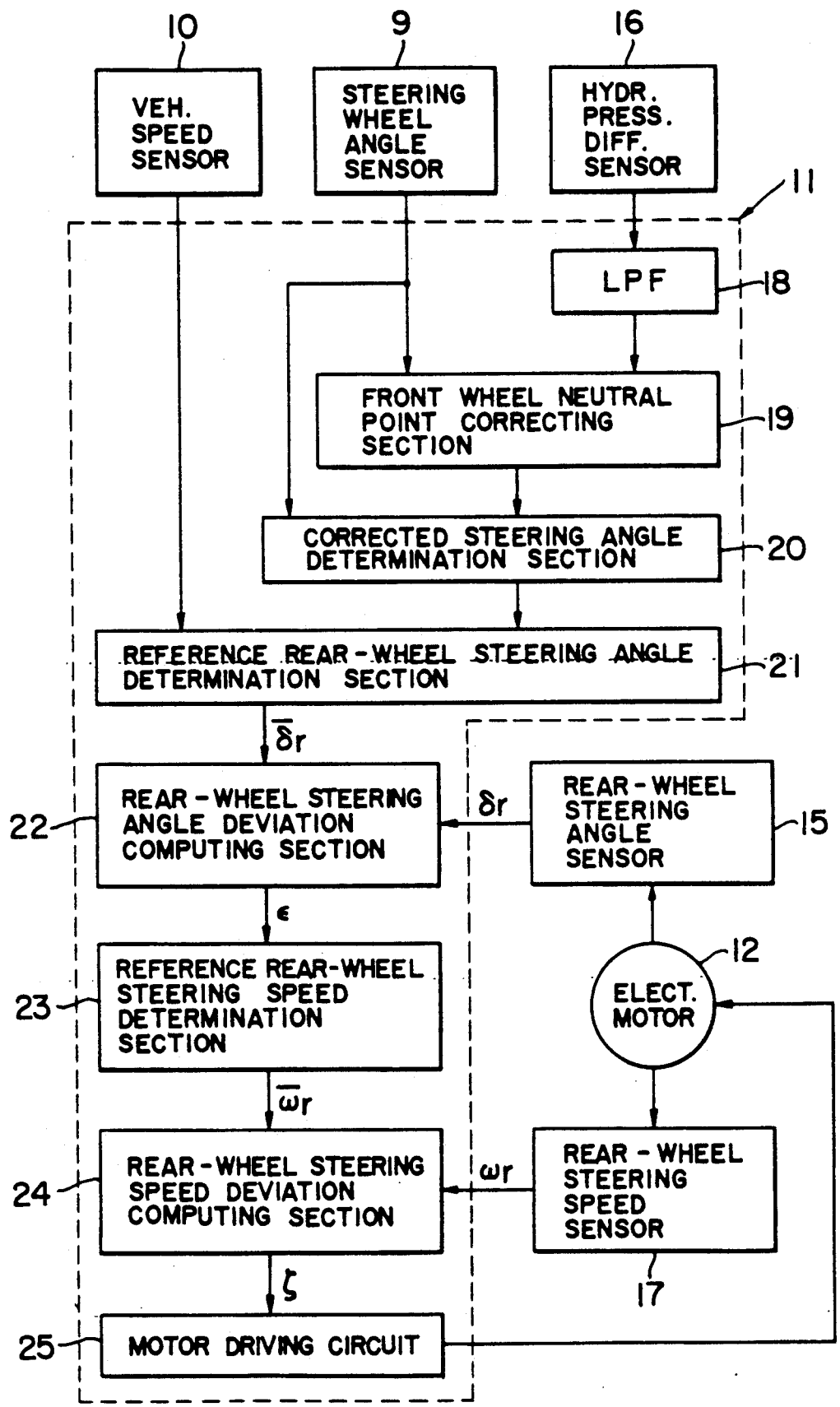
FIG. 2 is a block diagram of a control unit in the rear-wheel steering system of the present invention.

As described, the control unit 11 determines the reference rear-wheel steering angle in dependency on the steering angle signal from the steering wheel angle sensor 9 and the vehicle speed signal from the vehicle speed sensor 10. As shown in FIG. 2, the control unit 11 comprises the following components.

One component is a low-pass filter (LPF) 18. The LPF receives the detection signal from the hydraulic pressure difference sensor 16 and removes therefrom noise signals generated by external disturbances. The resulting difference signal representing the front-wheel steering force or the front-wheel lateral force is supplied to a front-wheel neutral point correcting section 19, which is another component. The section 19 operates to correct the front-wheel neutral point of the front-wheel steering angle signal supplied by the steering wheel angle sensor 9 when the difference signal indicates the zero point of the front wheel steering force and the front-wheel lateral force.

The front-wheel neutral point thus corrected is transmitted to a corrected steering angle determination section 20. The determination section 20 operates with the corrected front-wheel neutral point as a reference to determine the actual front-wheel steering angle which is equal to the difference between the corrected front-wheel neutral point and the front-wheel steering angle detected by the steering wheel angle sensor 9. The resulting output of the determination section 20 is supplied to a reference rear-wheel steering angle determination section 21. The section 21 operates in dependency on the actual front wheel steering angle thus corrected and of the vehicle speed detected by the vehicle speed sensor 10 to determine the reference rear-wheel steering angle.

Figure 3:
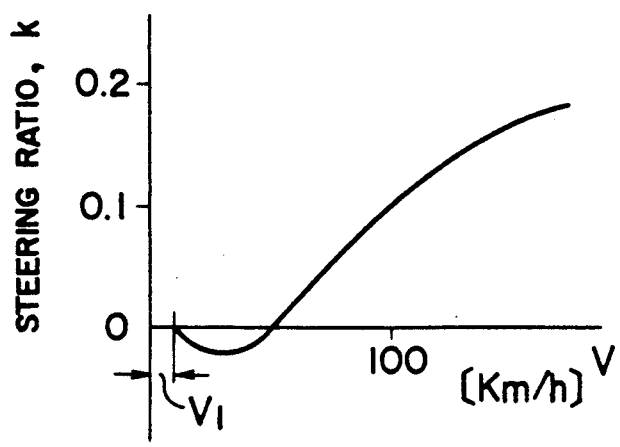
FIG. 3 is a graph indicating the setting characteristic of a steering ratio as a function of vehicle speed.

The determination of the reference rear-wheel steering angle is carried out, for example, by multiplying the front-wheel steering angle by a coefficient k wherein the vehicle speed V is a variable. The coefficient k is, for example, set by a function of the vehicle speed V as indicated in FIG. 3.

The reference rear-wheel steering angle $\overline{\delta r}$ thus determined is supplied to a rear-wheel steering angle deviation computing section 22. The actual rear-wheel steering angle $\delta r$ is also supplied to this computing section 22 from the rear-wheel steering angle sensor 15. The deviation computing section 22 thereupon computes a deviation $\epsilon$ from the difference $\overline{\delta r} - \delta r = \epsilon$. Then, the deviation $\epsilon$ is transmitted to a reference rear-wheel steering speed determination section 23. The determination section 23 determines a reference rear-wheel steering speed $\overline{\omega r}$ in dependency on the magnitude of the deviation $\epsilon$.

The actual rear-wheel steering speed $\omega r$ is detected by a rear-wheel steering speed sensor 17 for detecting the rotational speed of the motor 12. The actual steering speed $\omega r$ thus detected is transmitted to a rear-wheel steering speed deviation computing section 24. The computing section 24 determines a deviation $\xi$ of the actual steering speed $\omega r$ thus detected from the reference rear-wheel steering speed $\overline{\omega r}$. An output signal of the deviation $\xi$ of the computing section 24 is transmitted to a motor driving circuit 25. The motor driving circuit 25 operates the motor 12 to steer the rear wheels 14, 14 so that the deviation $\epsilon$ becomes zero.

When the vehicle is stopped or is driven at an extremely low speed, almost no front-wheel lateral force develops even when the vehicle is making a turn. Therefore, at such an extremely low vehicle speed (within the speed range $V_1$ in FIG. 3), rear-wheel steering can not be carried out.

An example of application of the present invention to an automobile equipped with a hydraulic type power steering device has been described above. The present invention, however, is not so limited. That is, for example, it can be applied to an automotive vehicle provided with a power steering device of another type, for example, an electric-driven type in which steering assist force is produced by the torque of an electric motor. In such a vehicle, the front-wheel steering force or the front-wheel lateral force can be detected from the value of the electric current flowing through the electric motor. In case of an automotive vehicle not provided with a power steering device, a known type of steering torque sensor is installed in a part, such as the steering shaft, of the front-wheel steering system. The front-wheel steering force or the front-wheel lateral force can then be detected. In the practice of the present invention, any known means, including sensors of the above described type, for detecting the front-wheel steering force or the front-wheel lateral force can be used.

Furthermore, the present invention is not limited to the rear-wheel steering mechanism, the rear-wheel steering control means, and other related means in the example described above and illustrated in the drawings. The present invention can be applied also to any known means of pertinent type in vehicles.

Figure 4:
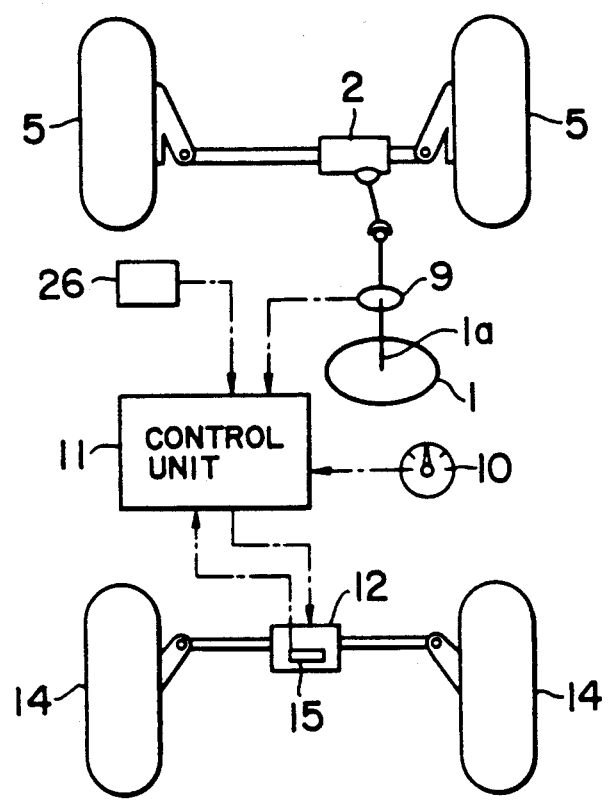
FIG. 4 is a schematic plan view showing another example of the control system for the rear-wheel steering system.
Figure 5:
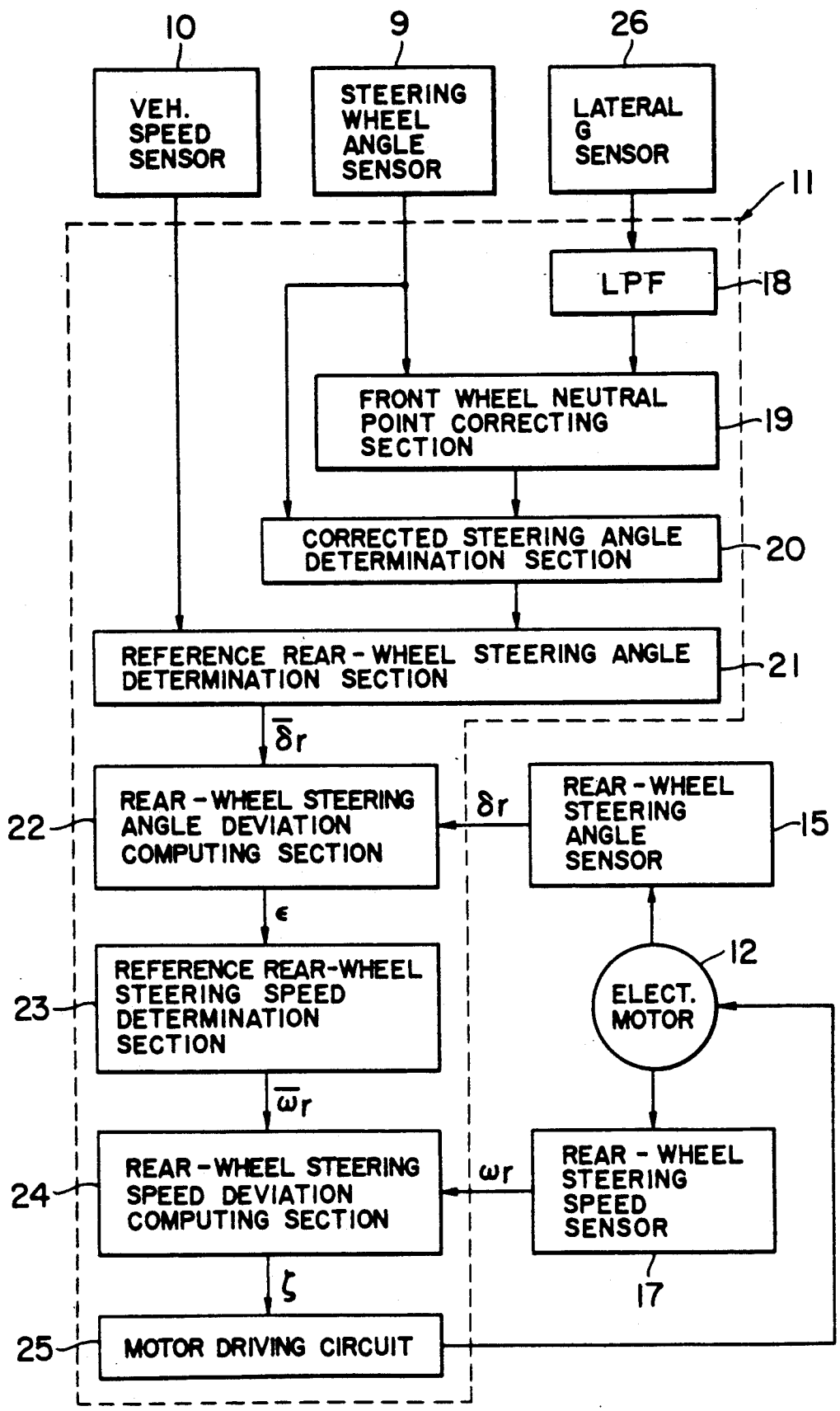
FIG. 5 is a block diagram of a control unit in the control system shown in FIG. 4.

In another example of application of the present invention as illustrated in FIGS. 4 and 5, the essential parts of the vehicle four-wheel steering system are substantially the same or similar to corresponding parts in the preceding example. In this second example, also, a steering wheel angle sensor 9, a vehicle speed sensor 10, and a rear-wheel steering angle sensor 15 are provided to function as in the preceding example. The essential difference in this example is the use of a lateral G sensor 26 in place of the hydraulic pressure difference sensor 16. The lateral G sensor 26 detects any acceleration G in the lateral direction of the vehicle. A detection output signal from the lateral G sensor 26 is supplied to a control unit 11, more specifically, to the low-pass filter 18 of the control unit 11 as indicated in FIG. 5. The components and their organization in the control unit 11 are essentially the same as those of the control unit 11 in the preceding example.

During travel of the vehicle, a lateral G does not act on the vehicle body as long as the front wheels are not steered to turn the vehicle. Therefore, when the detection signal from the lateral G sensor 26 is zero, this means that the front wheels 5, 5 are not being steered and are in the state for straight-ahead driving.

The control unit 11 determines the reference rear-wheel steering angle in dependency on the front-wheel steering angle signal from the steering wheel angle sensor 9 and the vehicle speed signal from the vehicle speed sensor 10. As indicated in FIG. 5, a signal detected by the lateral G sensor 26 is supplied to the low-pass filter LPF 18. In the LPF 18, noise signals generated by external disturbances are removed from the signal. The resulting signal is supplied to the front wheel neutral point correcting section 19 as in the preceding example. The operation thereafter of the control unit 11 in controlling the steering of the rear wheels 14, 14 is the same as in the preceding example.

From the foregoing description, it will be seen that the present invention has the following effectiveness and usefulness.

The present invention provides a rear-wheel steering system particularly applicable to a four-wheel steering vehicle in which the rear wheels are steered in dependency on a signal concerning the front wheel steering angle and the vehicle speed detected respectively by a front wheel steering angle sensor and a vehicle speed sensor. In a vehicle of this character, the present invention provides, in a control unit for rear-wheel steering, front-wheel neutral point correction means for determining the zero point of the front-wheel steering angle, which is to make the rear-wheel steering angle zero, at substantially the zero point of the detection signal from detecting means for detecting the steering force, the lateral force of the front wheels or lateral acceleration of the vehicle.

By this provision, it is completely eliminated that the undesirable possibility of the rear wheels being steered in spite of the fact that the front wheels are actually in a straight-ahead driving state. Thus, rear-wheel steering of high reliability can be carried out over a long service period. Furthermore, the computation for the neutral point correction becomes very simple. The expected results can be fully achieved with the use of a simple sensor of an incremental type for the front-wheel steering angle sensor. Therefore, the present invention affords many advantages including low cost.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. In a rear-wheel steering system for four-wheel steering vehicle having a front-wheel steering angle sensor for detecting a front-wheel steering angle, a vehicle speed sensor for detecting a vehicle speed, a control unit for carrying out rear-wheel steering control in accordance with an actual front-wheel steering angle represented by a deviation of the front-wheel steering angle from a neutral point of the steering and the vehicle speed, and an actuator controlled by the control unit to steer the rear wheels, the improvement of the rear-wheel steering system comprising:

detecting means for detecting front-wheel steering force, front-wheel lateral force or acceleration in the lateral direction of the vehicle and for producing a detection signal; and front-wheel neutral point correcting means provided in said control unit for resetting said neutral point of the steering to a reference value of said front-wheel steering angle at a time when said detection signal indicates a straight-ahead driving state of the vehicle.

2. The rear-wheel steering system according to claim 1 in which said control unit further comprises;

corrected steering angle determining means for determining the actual front-wheel steering angle by calculating the deviation of the front-wheel steering angle signal from the neutral point of the steering.

3. The rear-wheel steering system according to claim 2 further comprises:

a rear-wheel steering angle sensor for detecting a rear-wheel steering angle;

a rear-wheel steering angle sensor for detecting a rear-wheel steering speed;

reference rear-wheel steering angle determination means responsive to the vehicle speed and the actual front-wheel steering angle for determining a reference rear-wheel steering angle;

rear-wheel steering angle deviation computing means responsive to the reference rear-wheel steering angle and the rear-wheel steering angle for calculating the angle deviation of the rear-wheel steering angle from the reference rear-wheel steering angle;

reference rear-wheel steering speed determination means responsive to the angle deviation for determining a reference rear-wheel steering speed;

rear-wheel steering speed deviation computing means responsive to the reference rear-wheel steering speed and the rear-wheel steering speed for computing the speed deviation of the rear-wheel steering speed from the reference rear-wheel steering speed; and an actuator driving circuit responsive to the speed deviation for driving said actuator in rear-wheel steering operation.

4. The rear-wheel steering system according to claim 1 further comprising:

a hydraulic power steering mechanism for generating power by hydraulic pressure to assist the steering of the front wheels, said hydraulic pressure being detected by said detecting means as the steering force.

5. The rear-wheel steering system according to claim 1 further comprising:

an electric power steering mechanism having a motor to generate power based on electric current flowing through said motor to assist the steering of the front wheels, said electric current being detected by said detecting means as the steering force.

6. A rear-wheel steering system for a four-wheel steering vehicle, having a front-wheel steering angle sensor for detecting a front-wheel steering angle, a vehicle speed sensor for detecting vehicle speed, a control unit for controlling the steering of the rear-wheel in accordance with said front-wheel steering angle and said vehicle speed and for generating a control signal, an actuator responsive to said control signal for controlling the steering of the rear-wheel, a rear-wheel steering speed sensor for detecting an actual rear-wheel steering speed, and a rear-wheel steering angle sensor for detecting an actual rear-wheel steering angle, the improvement of the system which comprises:

detecting means for detecting front-wheel steering force, front-wheel lateral force or lateral acceleration of the vehicle and for producing a detection signal;

front-wheel neutral point correcting means for correcting a neutral point of the steering of the front wheels by a value of said front-wheel steering angle at a time when said detection signal indicates a straight-ahead driving state of the vehicle;

calculating means for calculating an actual front-wheel steering angle corresponding to the difference between said neutral point and said front-wheel steering angle detected by the front-wheel steering angle sensor;

setting means responsive to said actual front-wheel steering angle and said vehicle speed for setting a reference rear-wheel steering angle;

determining means responsive to said reference rear-wheel steering angle for determining a reference rear-wheel steering speed;

computing means for computing a speed deviation between said reference rear-wheel steering speed and said actual rear-wheel steering speed and for producing a speed deviation signal; and a driving circuit responsive to said speed deviation signal for driving the actuator in said reference rear-wheel steering speed so as to keep said four-wheel steering vehicle in a straight running direction.

* * * * *